United States Patent
Claudatos et al.

(10) Patent No.: US 7,299,263 B2
(45) Date of Patent: *Nov. 20, 2007

(54) DATA MESSAGE MIRRORING AND REDIRECTION

(75) Inventors: Christopher H. Claudatos, San Jose, CA (US); William D. Andruss, Minneapolis, MN (US)

(73) Assignee: EMC Corporation, Hopkintown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/474,093

(22) Filed: Jun. 23, 2006

(65) Prior Publication Data

US 2007/0071213 A1    Mar. 29, 2007

Related U.S. Application Data

(63) Continuation of application No. 10/936,439, filed on Sep. 7, 2004, now Pat. No. 7,095,829.

(60) Provisional application No. 60/500,725, filed on Sep. 4, 2003.

(51) Int. Cl.
*G06F 15/16* (2006.01)
(52) U.S. Cl. .............. 709/206; 709/229; 709/245; 726/27
(58) Field of Classification Search ............ 379/88.17, 379/88.22; 709/206, 229, 245; 726/27
See application file for complete search history.

(56) References Cited

U.S. PATENT DOCUMENTS

| | | | |
|---|---|---|---|
| 5,416,831 A | 5/1995 | Chewning et al. | |
| 5,432,845 A | 7/1995 | Burd et al. | |
| 5,796,948 A | 8/1998 | Cohen | |
| 5,890,163 A * | 3/1999 | Todd | 707/200 |
| 6,085,231 A | 7/2000 | Agraharam et al. | |
| 6,128,739 A | 10/2000 | Fleming, III | |
| 6,311,055 B1 | 10/2001 | Boltz | |
| 6,327,343 B1 | 12/2001 | Epstein et al. | |
| 6,442,595 B1 * | 8/2002 | Kelly | 709/206 |
| 6,442,686 B1 | 8/2002 | McArdle et al. | |
| 6,487,586 B2 * | 11/2002 | Ogilvie et al. | 709/206 |
| 6,522,727 B1 | 2/2003 | Jones | |
| 6,064,963 A1 | 5/2003 | Gainsboro | |
| 6,609,138 B1 * | 8/2003 | Merriam | 707/204 |
| 6,643,684 B1 * | 11/2003 | Malkin et al. | 709/206 |

(Continued)

FOREIGN PATENT DOCUMENTS

WO    WO 01/76181    10/2001

OTHER PUBLICATIONS

"Method for Preclude Unauthorized Sending or Forwarding of Mail Items" IBM Technical Disclosure Bulletin, IBM Corp. New York, US, vol. 37, No. 3, Mar. 1, 1994, p. 199, XP000441437, ISSN: 0018-8689.

(Continued)

*Primary Examiner*—Fan Tsang
*Assistant Examiner*—Simon Sing
(74) *Attorney, Agent, or Firm*—Van Pelt, Yi & James LLP

(57) ABSTRACT

Processing data messages is disclosed. A data message or a copy thereof is sent to a destination other than an intended recipient with which the data message is associated, for processing at said destination in accordance with a policy. The data message or a copy thereof is sent to said destination other than the intended recipient by a sending equipment used to generate the data message.

31 Claims, 11 Drawing Sheets

U.S. PATENT DOCUMENTS

| | | | |
|---|---|---|---|
| 6,694,436 B1 * | 2/2004 | Audebert | 726/9 |
| 6,721,785 B1 * | 4/2004 | Raghunandan | 709/206 |
| 6,765,996 B2 * | 7/2004 | Baxter, Jr. | 379/88.14 |
| 6,779,022 B1 | 8/2004 | Horstmann et al. | |
| 6,785,704 B1 | 8/2004 | McCanne | |
| 6,826,609 B1 * | 11/2004 | Smith et al. | 709/225 |
| 6,868,498 B1 * | 3/2005 | Katsikas | 726/14 |
| 7,031,437 B1 | 4/2006 | Parsons et al. | |
| 7,106,850 B2 * | 9/2006 | Campbell et al. | 379/265.09 |
| 2002/0107950 A1 * | 8/2002 | Lu | 709/223 |
| 2002/0147734 A1 * | 10/2002 | Shoup et al. | 707/200 |
| 2004/0153499 A1 | 8/2004 | Burd et al. | |
| 2004/0259534 A1 | 12/2004 | Chaudhari et al. | |
| 2005/0031107 A1 | 2/2005 | Fotta | |
| 2005/0053084 A1 | 3/2005 | Abrol et al. | |
| 2006/0148495 A1 | 7/2006 | Wilson | |

OTHER PUBLICATIONS

U.S. Appl. No. 10/936,439, filed Sep. 7, 2004, Claudatos et al.
U.S. Appl. No. 10/936,443, filed Sep. 7, 2004, Claudatos et al.
U.S. Appl. No. 10/936,442, filed Sep. 7, 2004, Claudatos et al.
U.S. Appl. No. 11/173,949, filed Jun. 30, 2005, Claudatos et al.
U.S. Appl. No. 10/884,453, filed Jul. 1, 2004, Claudatos et al.
U.S. Appl. No. 10/884,477, filed Jul. 1, 2004, Claudatos et al.
U.S. Appl. No. 10/884,345, filed Jul. 1, 2004, Claudatos et al.
U.S. Appl. No. 10/884,473, filed Jul. 1, 2004, Claudatos et al.
U.S. Appl. No. 60/500,453, filed Sep. 5, 2003, Claudatos.
LEGATO, Email Management Solutions, The EmailXtender Family, 2004, http://www.legato.com/products/emailxtender/.
LEGATO, EmailXtender Archive Edition, Email Archiving Software, 2004, http://www.legato.com/products/emailxtender/emailarchive.cfm.
LEGATO, EmailXaminer, Email Monitoring Software, EmailExaminer the Email Compliance Manager, 2004, http://www.legato.com/products/emailxtender/emailxaminer.cfm.
EMMA™ E-Mail Monitoring Archive, 2004, http://elstore.com/emmamain.html.

* cited by examiner

DATA MESSAGE MIRRORING AND REDIRECTION

CROSS REFERENCE TO OTHER APPLICATIONS

Continuation of prior application Ser. No. 10/936,439, filed Sep. 7, 2004 now U.S. Pat. No. 7,095,829.

This application claims priority to U.S. Provisional Patent Application No. 60/500,725 entitled SMS MESSAGE PROCESSING filed Sep. 4, 2003 which is incorporated herein by reference for all purposes.

Co-pending U.S. patent application Ser. No. 10/936,443 entitled MIRRORED DATA MESSAGE PROCESSING is incorporated herein by reference for all purposes; and co-pending U.S. patent application Ser. No. 10/936,442 entitled DATA MESSAGE PROCESSING is incorporated herein by reference for all purposes.

FIELD OF THE INVENTION

The present invention relates generally to data messages. More specifically, data message mirroring and redirection is disclosed.

BACKGROUND OF THE INVENTION

In many contexts, an enterprise or other stakeholder may be required and/or may desire to keep track of and/or exercise control over network or other communications, e.g., communications among employees of a corporation and/or between such employees and third parties, such as the corporation's customers and/or members of the general public. The requirements of the Securities and Exchange Commission, National Association of Securities Dealers, HIPAA, Sarbanes-Oxley Act of 2002, and various anti-harassment and anti-discrimination laws are among the many legal and regulatory requirements that may give rise to a need on the part of a corporation or other entity to be able to monitor, record, archive, index, retrieve, analyze, and/or control employee (or other user) communications.

The task of monitoring and controlling communications is made more challenging by the proliferation in recent years of new communication technologies, such as e-mail, chat, instant messaging, and short message service (SMS) technology (the basic text character form of which is sometimes referred to as "text messaging", e.g., via a mobile phone or other mobile device, and technologies related to SMS such as Enhanced Message Service (EMS) and Multimedia Message Service (MMS), which enable longer messages and rich, multimedia content such as video to be sent. Some modern communication technologies involve the use of mobile communication devices and/or infrastructure beyond the control of the responsible entity, further complicating the task of monitoring and controlling user communications.

Therefore, there is a need for an effective way to monitor and/or control communications, including without limitation communications made using mobile and/or data messaging technology.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data message mirroring and redirection is disclosed. In one embodiment, a sending client system or device (e.g., a computer or a mobile communication device such as a mobile telephone) is configured to mirror data messages to a compliance system by encapsulating a copy of each message sent using the client system or device and sending the encapsulated copy to the compliance system. In one embodiment, the same infrastructure that is used to deliver the original message to its intended recipient (i.e., the destination to which the sender addressed it) may be used to send the encapsulated copy of the message to the compliance system. In some embodiments additional and/or different infrastructure may be used. In one embodiment, a sending client device or system may be configured to redirect a data message to a compliance system, which in one embodiment may be configured to relay the message to its intended recipient provided the message is not required to be blocked, e.g., per a policy or other rule the compliance system is configured to enforce.

Figure 1:
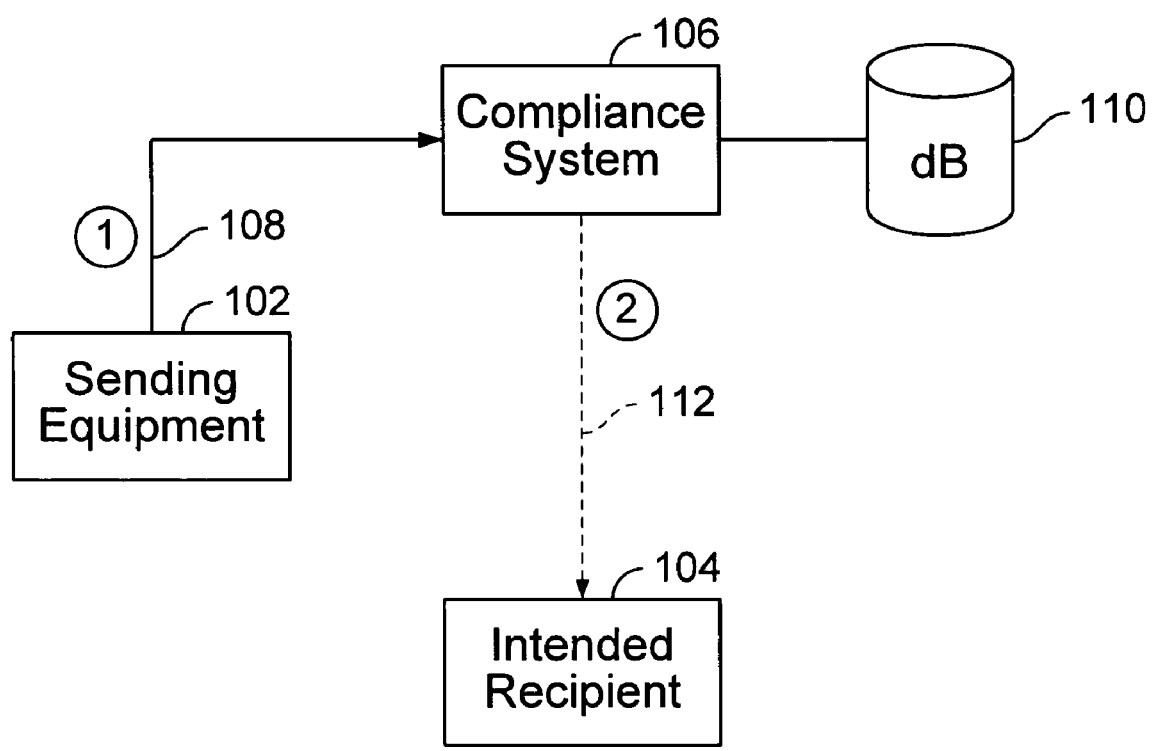
FIG. 1 is a block diagram illustrating data message redirection as implemented in one embodiment.

FIG. 1 is a block diagram illustrating data message redirection as implemented in one embodiment. Sending equipment 102 is configured to receive as input, e.g., from a user, message data associated with a message to be sent to an intended recipient equipment 104. In some embodiments, all or part of the message data may preexist on (e.g., in memory) and/or be generated internally by sending equipment 102, instead of and/or in addition to being received as input. In some embodiments, the message data received as input by (or generated by or otherwise available to) sending equipment 102 includes address information associated with intended recipient equipment 104 and message contents data representing content desired to be sent to the intended recipient equipment 104. Depending on the embodiment, the message may comprise an electronic mail message, an instant message, a chat message, data in xml or another suitable format, an SMS text or multi-media message, a voice-mail message, or any other message comprising any one or more types of content suitable for being rendered or otherwise processed, used, and/or stored by intended recipient equipment 104. In the example shown, sending equipment 102 is configured to prepare a message intended for intended recipient equipment 104 based on the message data received as input and redirect the message to a compliance system 106 via communication path 108.

In one embodiment, the sending equipment 102 is configured to redirect the message to compliance system 106 by preparing a message addressed to intended recipient 104 and encapsulating the message in a manner suitable for sending the encapsulated message to the compliance system 106 via communication path 108. In one embodiment, the communication path 108 may be the same as or different, in whole or in part, than the normal path (not shown in FIG. 1) by which the message would otherwise have been sent directly to the intended recipient equipment 104. For example, in the case of an SMS text message desired to be sent using sending equipment 102 to intended recipient equipment 104, e.g., from one mobile phone to another, in one embodiment sending equipment 102 would be configured to prepare the SMS text message addressed to intended recipient equipment 104, encapsulate the SMS text message, and send the encapsulated SMS text message to compliance system 106 via communication path 108. Depending on the embodiment, the encapsulated message may itself comprise an SMS message and communication path 108 may include at least in part the same or similar communication infrastructure (e.g., the same mobile phone network) as would otherwise (i.e., absent the redirection described herein) have been used to send the SMS text message directly from sending equipment 102 to the intended recipient equipment 104. In other embodiments, the encapsulated message may be delivered to the compliance system 106 at least in part by other and/or additional infrastructure, e.g., as an e-mail message or other type of data message that includes (in its content or as an attachment, depending on the technology used and the particular embodiment) the message desired to be sent using sending equipment 102 to intended recipient equipment 104.

In one embodiment, the sending equipment 102 is configured to redirect messages to compliance system 106 by modifying or otherwise configuring firmware associated with sending equipment 102 to perform such redirection. In one embodiment, the redirection may be implemented in sending equipment 102 by hardware design or modification. In one embodiment, the redirection may be implemented by software running on a processor associated with sending equipment 102. Any suitable technique for causing sending equipment 102 to redirect to compliance system 106 messages intended to be sent to recipients such as intended recipient equipment 104 may be used.

In the example shown in FIG. 1, compliance system 106 is connected to a database 110 configured to store data. In one embodiment, the database 110 is used by the compliance system 106 to maintain an archive of at least a subset of the data messages sent by sending equipment 102. In one embodiment, all messages sent by sending equipment 102 are archived. In one embodiment, metadata associated with each message sent by sending equipment 102 is processed to determine whether that message should be archived, e.g., per an applicable policy or other rule the compliance system 106 is configured to enforce. In one embodiment, all or part of the content of each message (or selected messages) is processed to determine whether that message should be archived. In one embodiment, for those messages to be archived the compliance system 106 stores the message contents (or a portion or representation thereof, such as an index) and associated metadata in database 110.

In one embodiment, the compliance system 106 may be configured to implement one or more policies and/or rules for determining which messages sent by sending equipment 102 are to be archived. In one embodiment, processing may be performed on the message contents and/or associated metadata to enforce and/or monitor compliance with additional policies and/or rules, such as by detecting the unauthorized transmission of proscribed data, such as trade secret or other confidential business information, insider information, information related to a pending transaction, information relating to an ongoing criminal or other investigation, or communications that may be considered harassing, obscene, discriminatory, or otherwise inappropriate.

In one embodiment, compliance system 106 is configured to quarantine messages that violate a policy or rule the compliance system 106 is configured to enforce. For example, in one embodiment if a message contains proscribed content, the message may be intercepted by compliance system 106 and not processed for delivery to intended recipient equipment 104. In one embodiment, for messages the compliance system 106 is not configured to block, the message is relayed by compliance system 106 to the intended recipient 104 via communication path 112.

In one embodiment, compliance system 106 may be configured to cure or otherwise respond to a message that triggers a policy or rule the compliance system 106 is configured to enforce, e.g., by modifying the message contents, such as by deleting or changing non-compliant content and/or adding additional content, such as by appending a notice, warning, or other content. For example, in the case of a message that based on processing and analysis by compliance system 106 is identified as on that may be considered a prediction of future corporate financial results, a standard "forward-looking statement" disclaimer may be appended in an effort to take advantage of the safe harbor provided for such statements under the Private Securities Litigation Reform Act of 1995.

Figure 2:
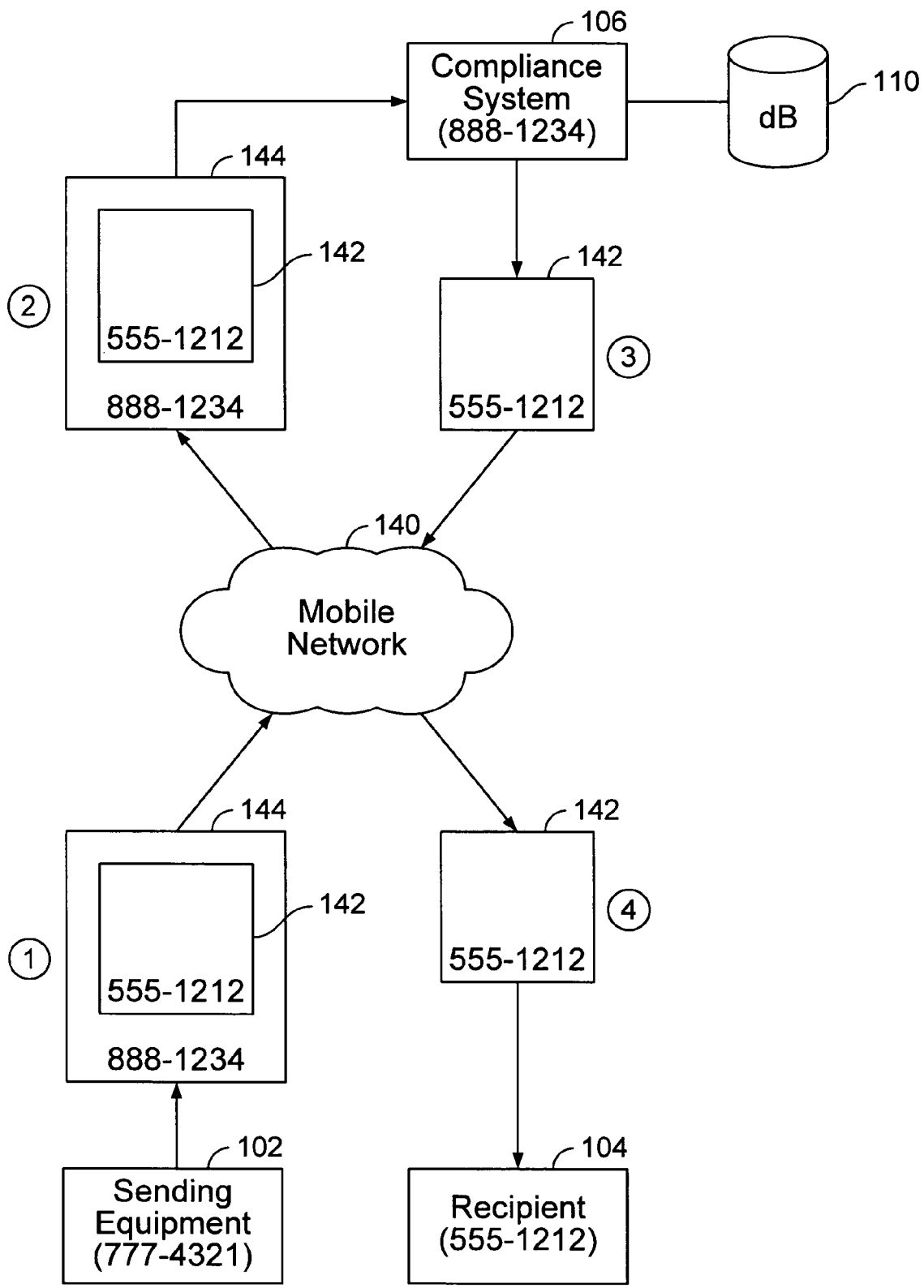
FIG. 2 is a block diagram illustrating data message redirection as implemented in one embodiment.

FIG. 2 is a block diagram illustrating data message redirection as implemented in one embodiment. In this example, the sending equipment 102 is configured to redirect an SMS or other data message to be sent via a mobile network to intended recipient equipment 104 to compliance system 106 by encapsulating the original message in an SMS (or other) message addressed to the compliance system 106. In the example shown, intended recipient 104 is associated on mobile network 140 with address 555-1212, which in this example is the fictional telephone number associated with intended recipient 104 on mobile network 140. The compliance system 106 similarly is associated with telephone number 888-1234. Sending equipment 102 is configured to prepare an SMS message 142 addressed to intended recipient equipment 104 at telephone number 555-1212 and redirect the SMS message 142 to compliance system 106 by encapsulating the SMS message 142 in SMS message 144 addressed to compliance system 106 at telephone number 888-1234.

Note that one or more of sending equipment 102, intended recipient 104, and compliance system 106 may comprise equipment that is not mobile equipment, notwithstanding the fact that in the example shown the communications between the various equipments are shown as traversing mobile network 140. Any equipment configured to access mobile network 140 directly or indirectly, e.g., through a gateway, modem, or other device, may be used in the example shown. In other embodiments, networks other than and/or in addition to mobile network 140 may be used to complete all of part of the communication between sending equipment 102 and compliance system 106 and/or the communication between compliance system 106 and intended recipient equipment 104, including without limitation a direct or indirect physical connection or a network connection via the Internet, the public switched telephone network, one or more local area and/or wide area networks, or any other public or private network. In such alternative embodiments, the encapsulated message 144 of FIG. 2 would comprise a message having the format and contents required to send the encapsulated message to compliance system 106 via the applicable communication path(s).

In the example shown in FIG. 2, the encapsulated message 144 is sent by sending equipment 102 into the mobile network 140, where it is processed normally and delivered to compliance system 106 based at least in part on the address information provided by sending equipment 102, e.g., in a header and/or other address portion associated with message 144 (i.e., in this example telephone number 888-1234). The message 144 is delivered to compliance system 106 by mobile network 140 and processed. In one embodiment, the processing comprises removing the encapsulation and processing the underlying message 142 intended for intended recipient equipment 104, e.g., as described above (e.g., archiving, relaying, blocking, modifying, etc., as appropriate). In the example shown, if appropriate the original message 142 is relayed by compliance system 106 to intended recipient equipment 142. In this example compliance system 106 sends the original message 142 to intended recipient equipment 104 via mobile network 140, which processes the messages normally and delivers it to intended recipient equipment 104. In one embodiment, address translation, source address spoofing, and/or other techniques may be used to make it appear to intended recipient equipment 104 that the original message 142 was received directly from sending equipment 102, as opposed to from compliance system 106. In the example shown, the compliance system 106 sends to intended recipient equipment 104 the original message 142 prepared by sending equipment 102. In one alternative embodiment, the compliance system 106 instead prepares for sending to intended recipient equipment 104 its own message having the same contents as the original message 142 prepared by sending equipment 102.

In one embodiment, sending equipment 102 also is configured to receive messages. In this case there are several methods for processing messages through compliance system 106. In one method, the address of compliance system 106 is the return address of the message sent by sending equipment 102. Messages sent by sending equipment 102 have a reply address which corresponds to the address of compliance system 106. In this manner, all messages in reply to messages sent by sending equipment 102 are actually sent to compliance system 106. Compliance system 106 applies policies and based on these determines if the replied to message is to be sent to sending equipment 102. Compliance system 106 determines the correct recipient from the header information, or through a comparison of known sent messages, or through analysis of the content, or any combination of these. In another method, compliance system 106 is the message address associated with a user associated with the sending equipment 102. For example, the user gives out his/her message address as 888-1234. This is what the user believes is his/her message address. In reality the actual message address associated with sending equipment 102 is 777-4321. The compliance system is the correct recipient of messages to 888-1234 (i.e. messages addressed to 888-1234 go to compliance system 106 since that is its address). In one embodiment, compliance system 106 can receive and process messages addressed to more than one address. Messages are then sent to compliance system 106 at address 888-1234. Compliance system 106 applies the relevant policies/rules and takes action accordingly. In one embodiment, if an incoming message is authorized to be delivered to sending equipment 102, the responsive action would include sending the message to sending equipment 102 at its actual (but hidden) address which is 777-4321. This example can also be illustrated using email addresses. In the case of email communications, in one embodiment the user gives out his/her email address as 888-1234@emc.com. This is what the user believes is his/her message address. In reality the actual email address as known by sending equipment 102 is 777-4321@emc.com. The compliance system is the correct recipient of messages to 888-1234@emc.com (i.e. messages addressed to 888-1234@emc.com go to compliance system 106 since that is its address.) Emails are then sent to compliance system 106 at address 888-1234@emc.com. Compliance system 106 applies the relevant policies/rules and takes action accordingly. In one embodiment, if an incoming message is authorized to be delivered to sending equipment 102, the responsive action would include sending the message to sending equipment 102 at its actual (but hidden) address which is 777-4321@emc.com. Security can be further enhanced my making sending equipment 102 only receive messages from compliance system 106 and no other sources. Messages from other sources are rejected. In another method, messages are sent to sending equipment 102 directly and sending equipment 102 is configured to send an encapsulated copy of the received message to compliance system 106. In one embodiment, the message is received by sending equipment 102 without notification or display to the user (of sending equipment 102) pending approval by compliance system 106. Upon receipt of a message, sending equipment 102 sends an encapsulated copy of the received message to compliance system 106. Compliance system 106 applies policies and if appropriate compliance system 106 archives the message and sends an approval message to the sending equipment 102. Upon receipt of the approval message, sending equipment 102 then displays the message to the user. If compliance system 106 does not approve of the message, sending equipment 102 is so informed and the originally received message is not displayed and is deleted. In one alternative embodiment, sending equipment 102 is configured to send to compliance system 106 an encapsulated copy of messages it receives but does not wait for any response before allowing the user/recipient to view the message. Compliance system 106 receives the encapsulated message and processes it according to policies.

Figure 3:
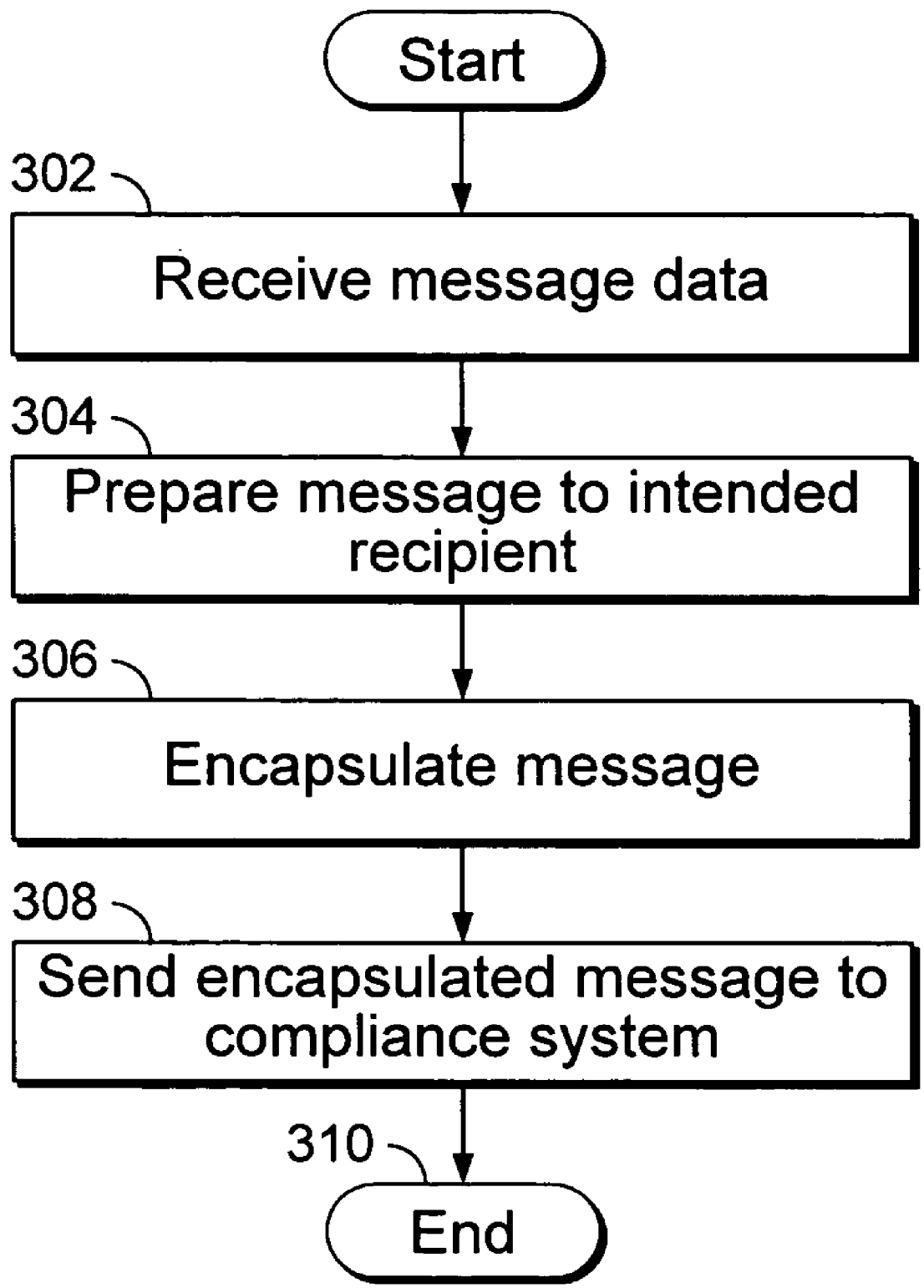
FIG. 3 is a flow chart illustrating a process used in one embodiment to redirect a data message.

FIG. 3 is a flow chart illustrating a process used in one embodiment to redirect a data message. In one embodiment, the process of FIG. 3 may be implemented on equipment used to send data messages, such as sending equipment 102 of FIGS. 1 and 2. Message data is received (302). In one embodiment, all or part of the message data is received via a user interface. In one embodiment, all or part of the message data is generated locally. In one embodiment, all or part of the message data is stored or otherwise available locally. A message to an intended recipient is prepared (304). In one embodiment, the message data received at 302 may comprise address or other information that identifies the intended recipient. The message to the intended recipient may be generated by creating new content data based on input received locally (e.g., from a user), by incorporating content received from another source (e.g., in the case of a previously received message, file, or other content that is being forwarded or otherwise included in the message), by incorporating content that otherwise preexists locally (e.g., content generated locally at a prior time and stored), or any combination of the above. The message is encapsulated (306). In one embodiment, the original message prepared at 304 is encapsulated in a manner suitable to redirect the message to a compliance system, such as by encapsulating the message prepared at 304 within, or otherwise including the original message in and/or appending it to, a message addressed to the compliance system. The encapsulated message is sent to the compliance system (308), after which the process ends (310). In one embodiment, the process of FIG. 3 is performed for each message, e.g., each time a new set of message data is received.

Figure 4:
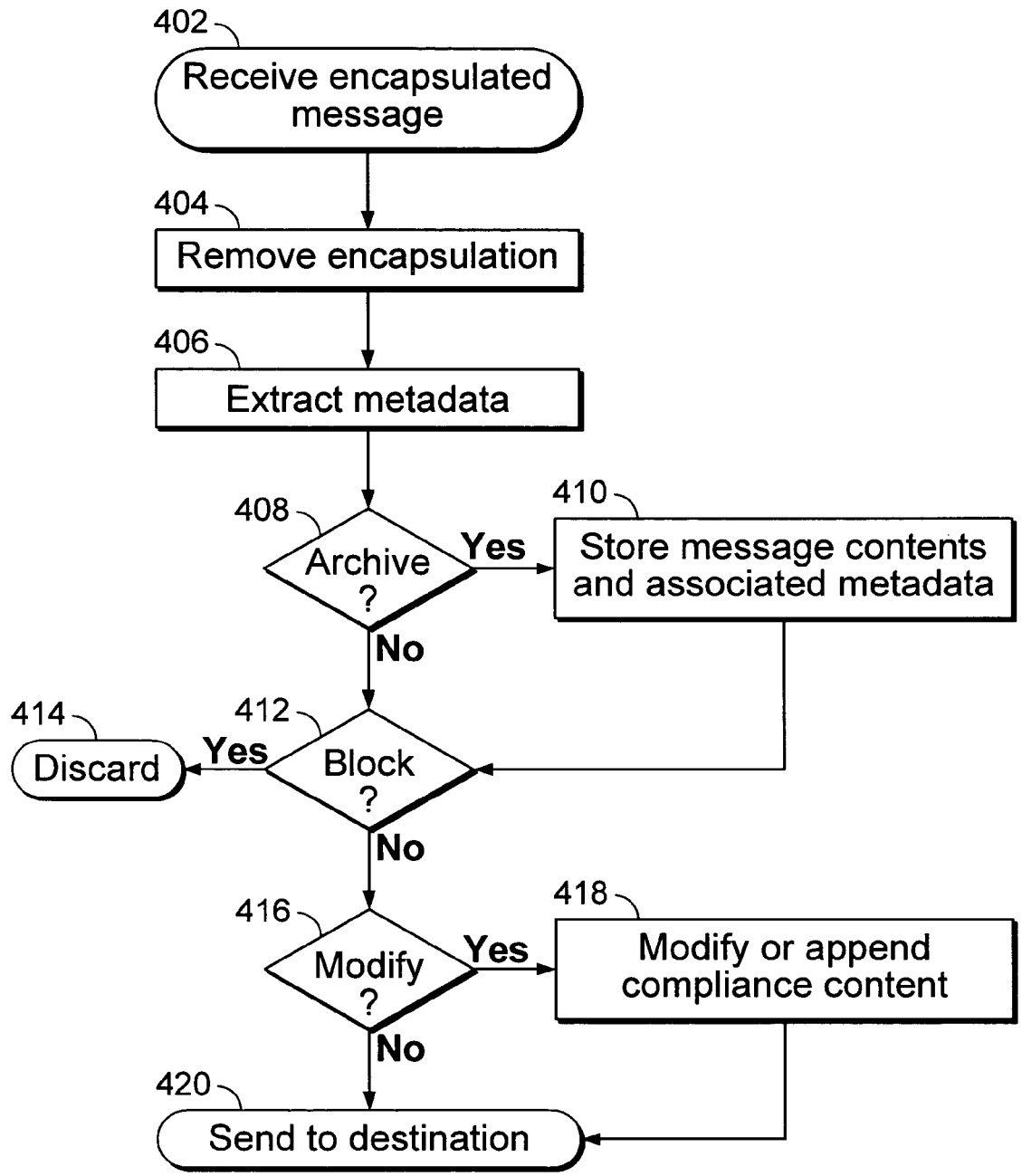
FIG. 4 is a flow chart illustrating a process used in one embodiment to process a redirected data message.

FIG. 4 is a flow chart illustrating a process used in one embodiment to process a redirected data message. The process of FIG. 4 is implemented in one embodiment on a compliance system, such as compliance system 106 of FIGS. 1 and 2. An encapsulated message is received (402). The encapsulation is removed (404). In one embodiment, removing the encapsulation comprises removing an encapsulation header. In one embodiment, the original message is not encapsulated and is instead forwarded as an attachment, and in such an embodiment 404 comprises opening or otherwise accessing the attachment. Metadata is extracted from the message (406). In one embodiment, metadata is extracted by examining the contents of a header or other message portion comprising address and/or other information associated with the message. In one embodiment, metadata is extracted by analyzing all or part of the message contents. The extracted metadata includes in one embodiment such information as the sender's address, the recipient's address, and data indicative of the contents of the message, such as a sample of the content, one or more keywords, a subject line or field, etc. It is determined whether the message is to be archived (408). In one embodiment, the determination whether to archive a message is based at least in part on metadata extracted in 406. In one embodiment, the determination whether to archive a message is based at least in part on the contents of the message and/or the results of an analysis thereof. In one embodiment, a policy or rule may be applied to metadata and/or content associated with a message to determine whether the message is required to be archived. In one alternative embodiment, all messages are archived and 408 and 410 are omitted from the process shown in FIG. 4. If the message is required to be archived, the message contents and associated metadata are stored (410). If the message is not required to be archived, or once the message contents and associated metadata have been stored, it is determined whether the message is required to be blocked (412). In one embodiment, a message may be blocked if it fails a test and/or violates a policy or rule. The determination whether to block a message may be based on an analysis of the message contents and/or metadata associated with the message. For example, messages containing content determined to be obscene, harassing, or discriminatory may be blocked. Likewise, message to and/or from a particular address and/or range of addresses may be blocked. A combination of messages contents and metadata may also be used to determine whether a message should be blocked, e.g., to prevent the disclosure of trade secret and/or other confidential business information to a recipient that is not part of the sender's organization. If it is determined that the message is to be blocked, the message is discarded (414) and is not forwarded on to the intended recipient. In one embodiment, the discard process includes sending a notification to the sender and/or an administrator. If the message is not required to be blocked, it is determined whether the message is required to be modified (416). For example, in one embodiment a compliance system may be configured to cure certain defects in a message, such as by deleting offensive language or content and/or replacing such language with more appropriate language or content. In one embodiment, a message that does not satisfy a policy or rule may be cured by appending a disclaimer, warning, or other statement or content to the message. If the message is required to be modified, any required modifications are made (e.g., modifying the content and/or appending any content required to be added) (418) prior to sending the modified message on to its intended final destination (420). Otherwise, the message is sent to the intended final destination in its original form (420).

Figure 5:
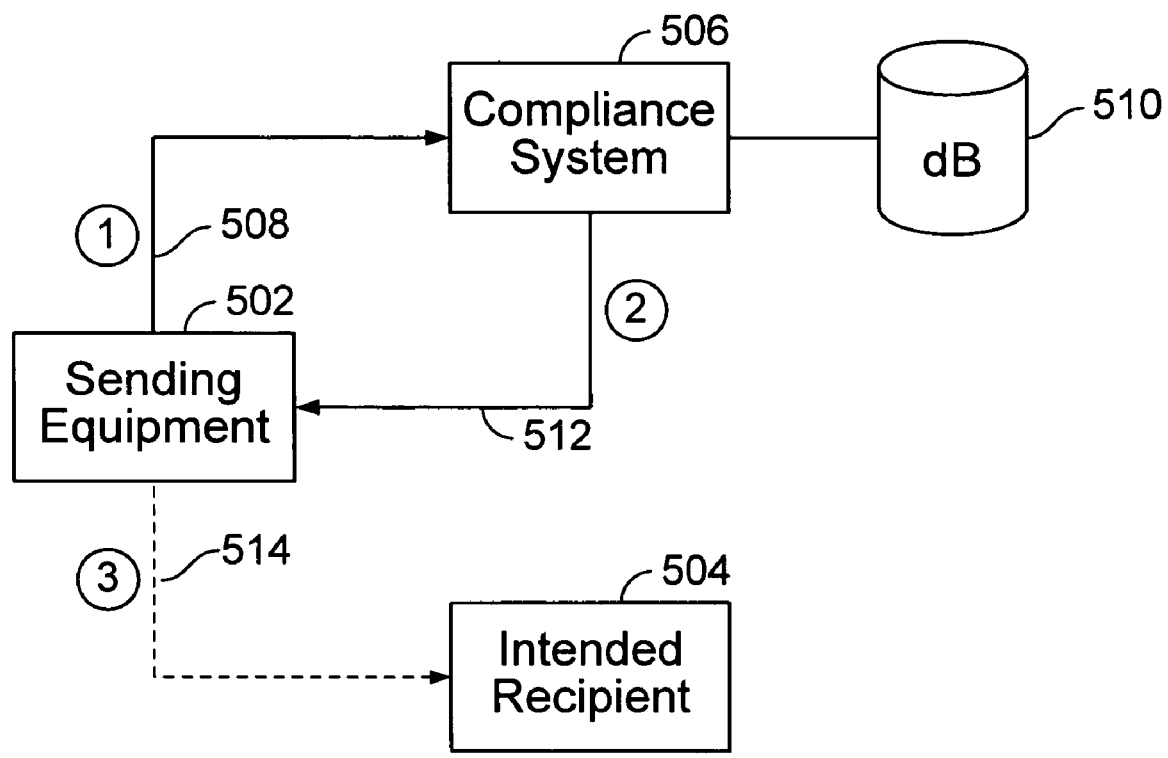
FIG. 5 is a block diagram illustrating data message redirection as implemented in one embodiment.

FIG. 5 is a block diagram illustrating data message redirection as implemented in one embodiment. Sending equipment 502 is configured to prepare a message intended to be sent to intended recipient equipment 504 via communication path 514; to encapsulate and send the message to compliance system 506, via communication path 508, for processing; and wait to receive from compliance system 506, via communication path 512, a reply indicating whether or not the original message is authorized to be sent by sending equipment 502 to intended recipient equipment 504 via communication path 514. In one embodiment, the compliance system 506 may be configured to store the message and/or data associated with it in a database 510 and/or to perform further analysis and/or processing as described herein. In one embodiment, the compliance system 506 is configured to apply one or more tests, rules, and/or policies to determine whether a reply should be sent to sending equipment 502 prohibiting the message from being sent to intended recipient 504, permitting the message to be sent after specified modifications and/or additions have been made, or authorizing the message to be sent in its original form. The sending equipment 502 is configured to process replies received from compliance system 506 and to discard, modify, and/or send the message to the intended recipient equipment 504 as required and/or allowed by the reply. Communication paths 508, 512, and 514 may comprise the same and/or different elements of the same communication infrastructure (e.g., a mobile telephone network) or, depending on the embodiment, one or more of said paths may comprise further and/or different elements and/or networks than one or more other of them.

Figure 6:
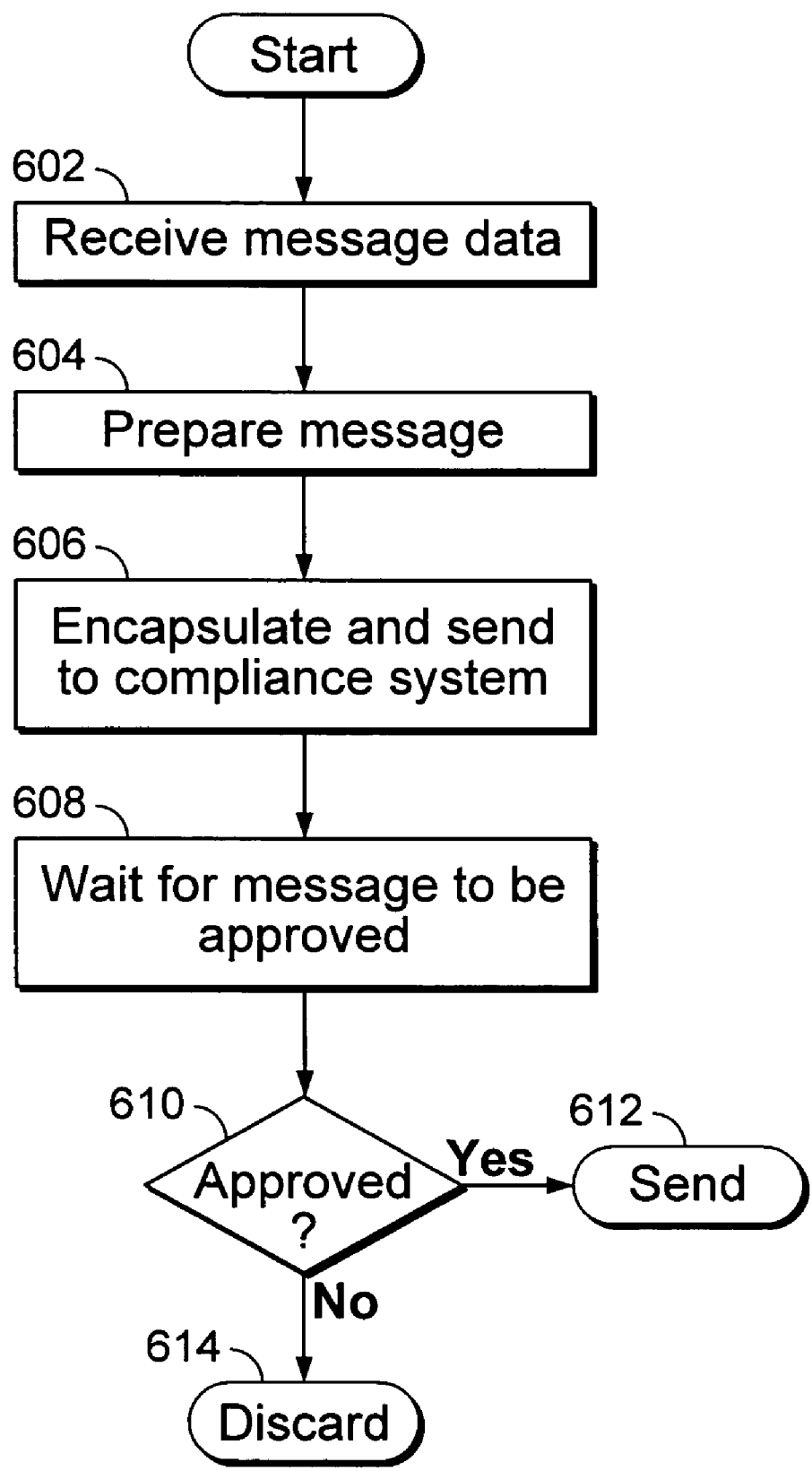
FIG. 6 is a flow chart illustrating a process used in one embodiment to redirect and obtain prior authorization for sending a data message.

FIG. 6 is a flow chart illustrating a process used in one embodiment to redirect and obtain prior authorization for sending a data message. In one embodiment, the process of FIG. 6 is implemented on sending equipment, such as sending equipment 502 of FIG. 5. Message data is received (602). A message to an intended recipient associated with the message data is prepared (604). The message is encapsulated and sent to a compliance system for processing and to obtain prior authorization for sending the original message to the intended recipient (606). A reply indicating whether the message is authorized to be sent to the intended recipient is awaited (608). If the message is approved (610), it is sent (612). Otherwise, it is discarded (614). In one embodiment, if the message is approved the sending equipment is configured to send the message without further action on the part of a user associated with the sending equipment, with the result that the redirection and pre-approval process is transparent to such a user. In one embodiment, if a message is rejected the sending equipment is configured to provide a notification of the rejection to a user of the sending equipment. In one embodiment, the response from the compliance system may require that the message be modified prior to being sent. In such an embodiment, additional processing not shown in FIG. 6 would be performed to implement the required modifications. In one such embodiment, the modified message is sent directly to the intended recipient. In one alternative embodiment, the modified message is sent to the compliance system for approval prior to being sent.

Figure 7:
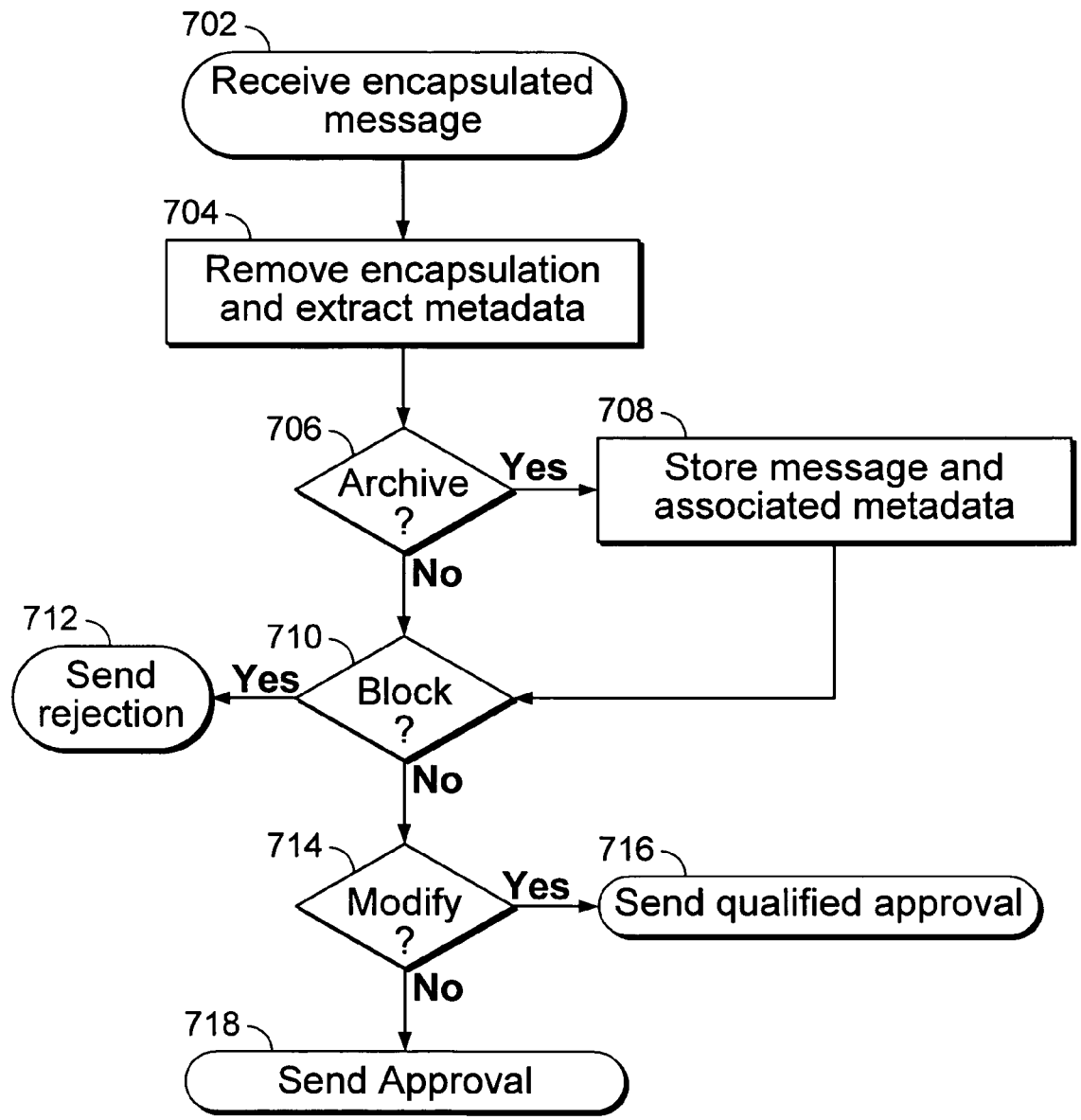
FIG. 7 is a flow chart illustrating a process used in one embodiment to process a redirected message.

FIG. 7 is a flow chart illustrating a process used in one embodiment to process a redirected message. In one embodiment, the process of FIG. 7 is implemented on a compliance system, such as compliance system 506 of FIG. 5. An encapsulated message is received (702). The encapsulation is removed and metadata is extracted (704). If it is determined that the message is required to be archived (706), the message and associated metadata are stored (708). It is determined whether the message should be blocked, e.g., for failing to comply with a policy or other rule (710). If the message is to be blocked, a rejection message is sent to the sending equipment that originated the message (712). In one embodiment, a notice is also sent to an administrator and/or the event logged. If the message is not required to be blocked, it is determined whether the message is required to be modified (714). If a modification is required, a qualified approval is sent (716). In one embodiment, the qualified approval message specifies the required modification. In one embodiment, the qualified approval message includes a modified version of the original message in which the required modification has been made. If the message is not required to be blocked or modified, an approval message is sent to the sending equipment to indicate that the message is authorized to be sent in its original form (718).

Figure 8:
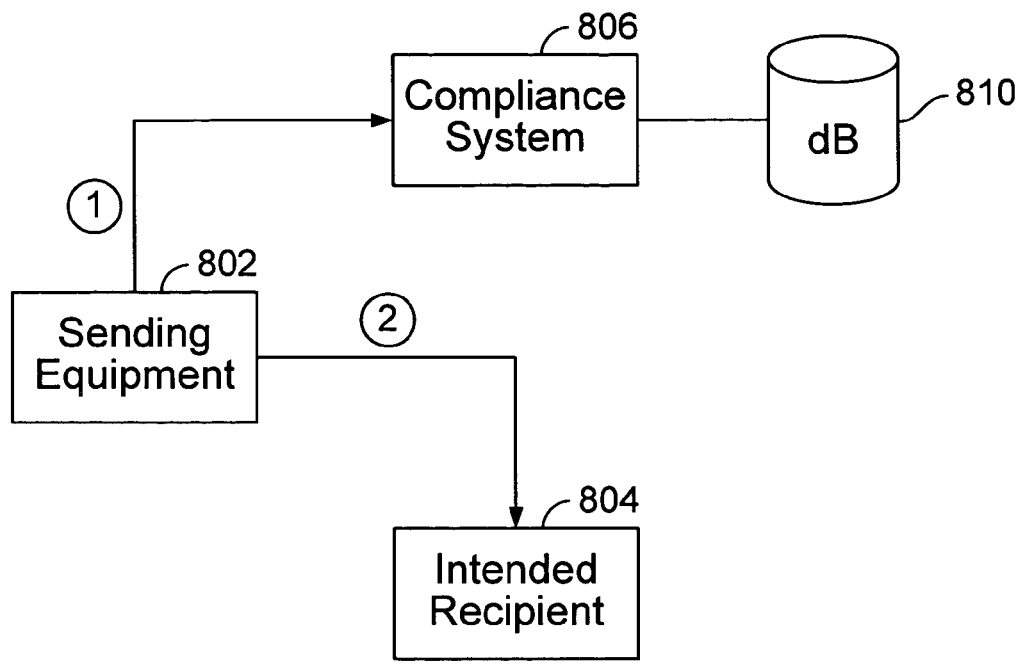
FIG. 8 is a block diagram illustrating data message mirroring as implemented in one embodiment.

FIG. 8 is a block diagram illustrating data message mirroring as implemented in one embodiment. Sending equipment 802 is configured to receive message data, prepare a message to an intended recipient 804 associated with the data, send a copy of the message to compliance system 806, and then send the original message to intended recipient 804. The compliance system 806 is configured to store data associated with at least selected messages in a database 810. Compliance system 806 may be configured to perform other functions, such as generating an alert, log entry, or other notification or event based on an analysis of message content and/or metadata associated with a message of which it receives a copy. In the embodiment shown in FIG. 8, the compliance system 806 has no way of preventing the message from being sent to the intended recipient. However, the archiving, analysis, monitoring, and reporting functions described herein may still be performed based on the copy received by the compliance system 806. In one embodiment, the sending system 802 is configured to only send the message to the intended recipient once a copy of the message has first been sent to the compliance system 806.

Figure 9:
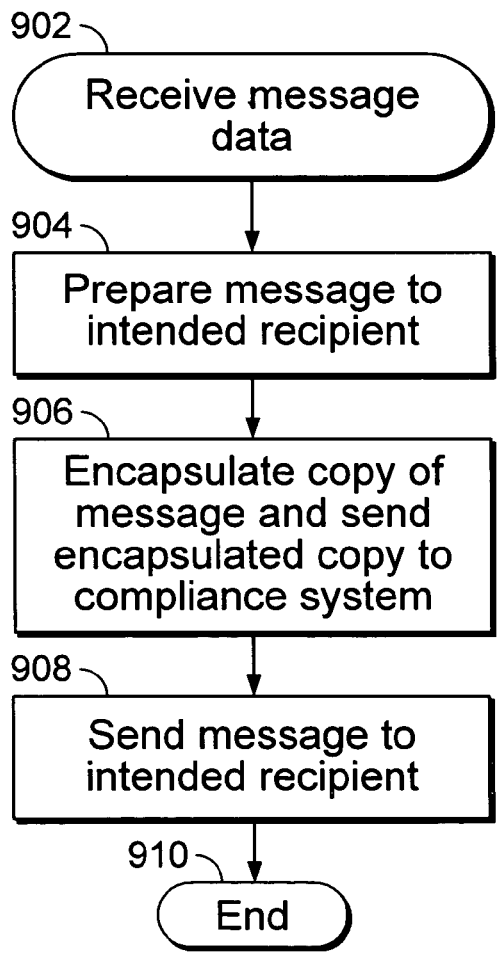
FIG. 9 is a flowchart illustrating a process used in one embodiment to provide a copy of a data message to a compliance system.

FIG. 9 is a flowchart illustrating a process used in one embodiment to provide a copy of a data message to a compliance system. In one embodiment, the process of FIG. 9 is implemented on sending equipment, such as sending equipment 802 of FIG. 8. Message data is received (902). A message to an intended recipient associated with the message data is prepared (904). A copy of the message is encapsulated and sent to a compliance system (906). The message is then sent to the intended recipient (908), after which the process ends (910).

Figure 10:
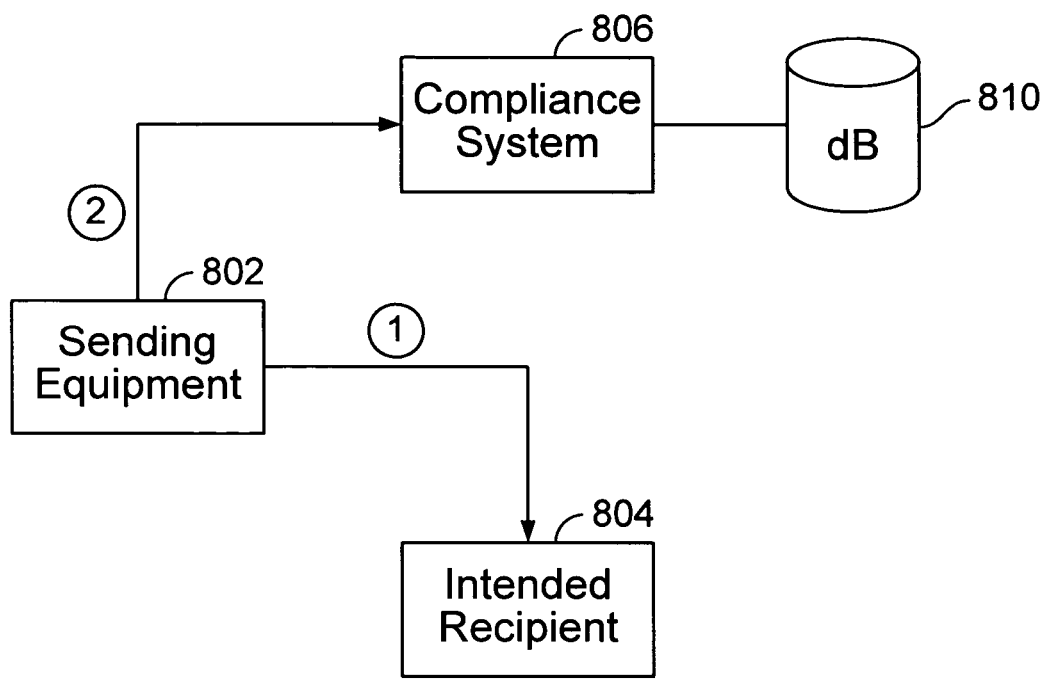
FIG. 10 is a block diagram illustrating data message mirroring as implemented in one embodiment.

FIG. 10 is a block diagram illustrating data message mirroring as implemented in one embodiment. In this example, the sending equipment 802 is configured to first send a message to its intended recipient equipment 804 and only then send an encapsulated copy of the message to compliance system 806. One advantage of the approach used in the embodiment shown in FIG. 10 is that the message is sent to intended recipient equipment 804 without delay. One possible disadvantage is that mirroring of the message to the compliance system 806 may be interrupted, delayed, and/or avoided, at least in theory, by shutting down and/or otherwise disrupting operation of the sending equipment 802 after the message has been sent to the intended recipient equipment 804 but before the encapsulated copy has been sent to the compliance system 806. The approach used in any particular case may depend on such factors as how critical it is that the data message be timely delivered to the intended recipient equipment 804 and how essential it is that the message be received and processed by the compliance system. In some embodiments, the approaches illustrated by FIGS. 8 and 10 may be combined and each message processed using one or the other of the approaches depending on the configuration of the sending equipment and/or the content of the message and/or associated metadata.

Figure 11:
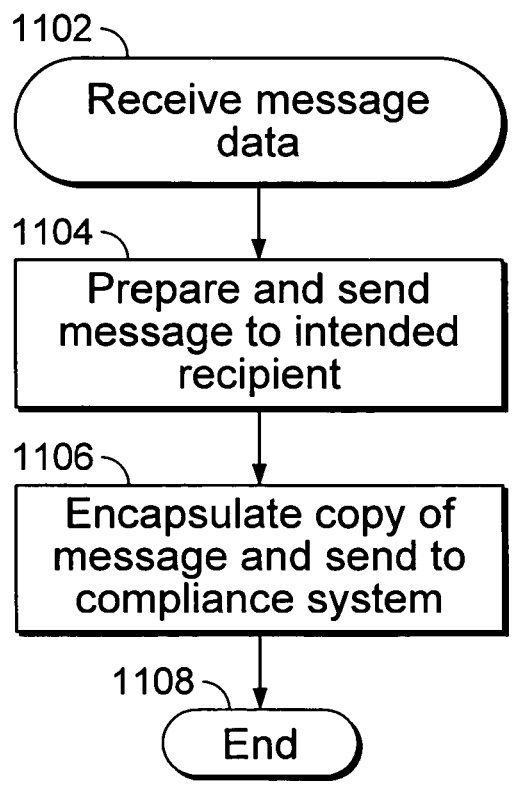
FIG. 11 is a flowchart that illustrates a process used in one embodiment to provide a copy of a data message to a compliance system.

FIG. 11 is a flowchart that illustrates a process used in one embodiment to provide a copy of a data message to a compliance system. In one embodiment, the process of FIG. 11 may be implemented on sending equipment, such as sending equipment 802 configured as shown in FIG. 10. Message data is received (1102). A message to an intended recipient associated with the message data is prepared and sent to the intended recipient (1104). A copy of the message is encapsulated and sent to a compliance system (1106), after which the process ends (1108). In one embodiment, an encapsulated copy is sent to the compliance system (1106) immediately or shortly after the original message is sent to the intended recipient. In one alternative embodiment, encapsulated copies of messages sent over a period of time are held and sent to the compliance system as a batch, e.g., periodically or at a prescribed or configured time(s).

Figure 12:
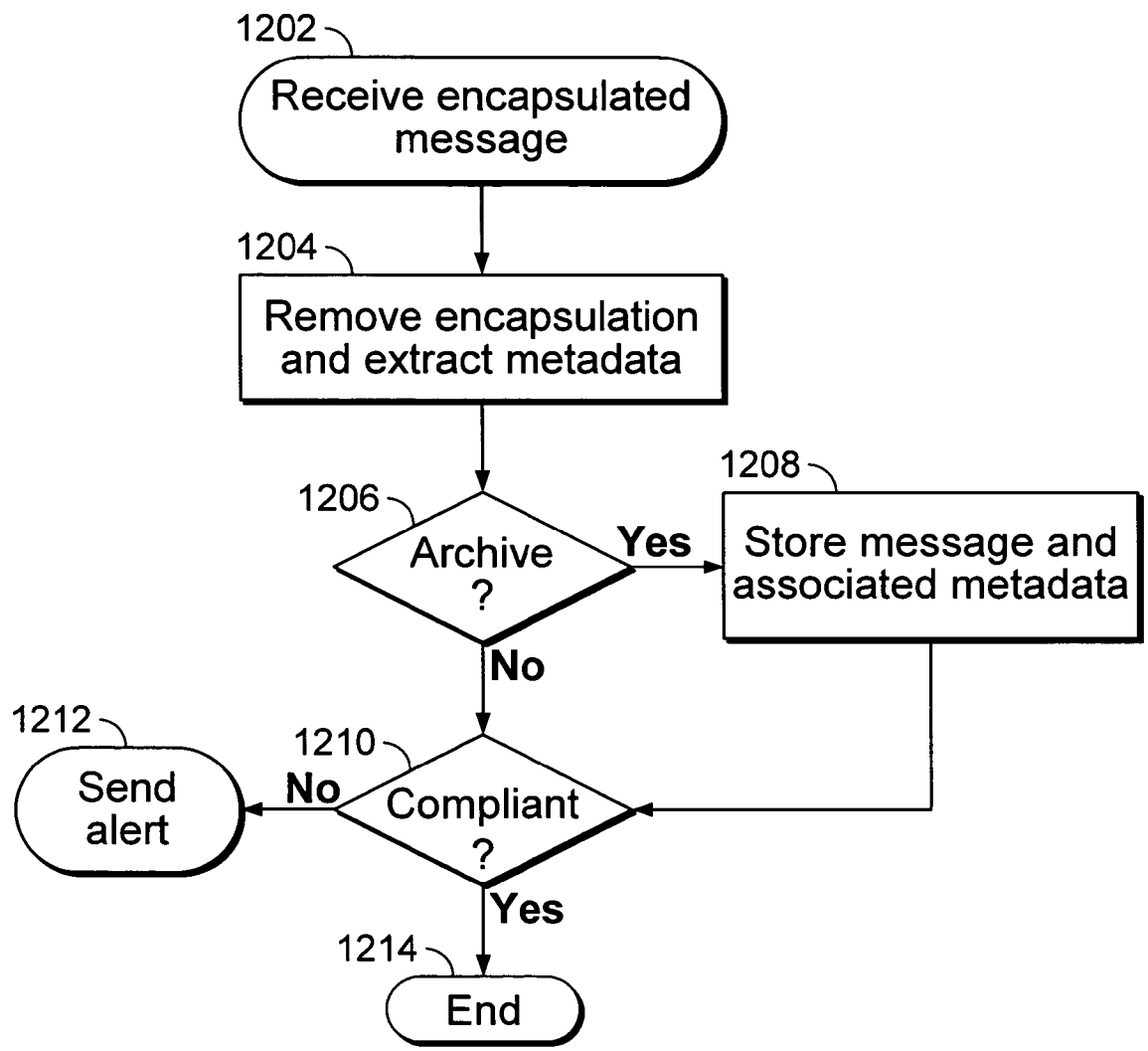
FIG. 12 is a flow chart that illustrates a process used in one embodiment to process a received encapsulated copy of a data message.

FIG. 12 is a flow chart that illustrates a process used in one embodiment to process a received encapsulated copy of a data message. In one embodiment, the process of FIG. 12 may be implemented on a compliance system, such as compliance system 802 of FIGS. 8 and 10. An encapsulated message is received (1202). The encapsulation is removed and metadata is extracted (1204). If it is determined that the message is required to be archived (1206), the message and associated metadata are stored (1208). It is determined whether the message complies with all applicable policies and/or other rules (1210). If the message is non-compliant, an alert is sent (1212), e.g., to an administrator or other responsible person and/or to a logging or other system or process. If the message complies with all applicable policies, the process ends (1214).

Figure 13:
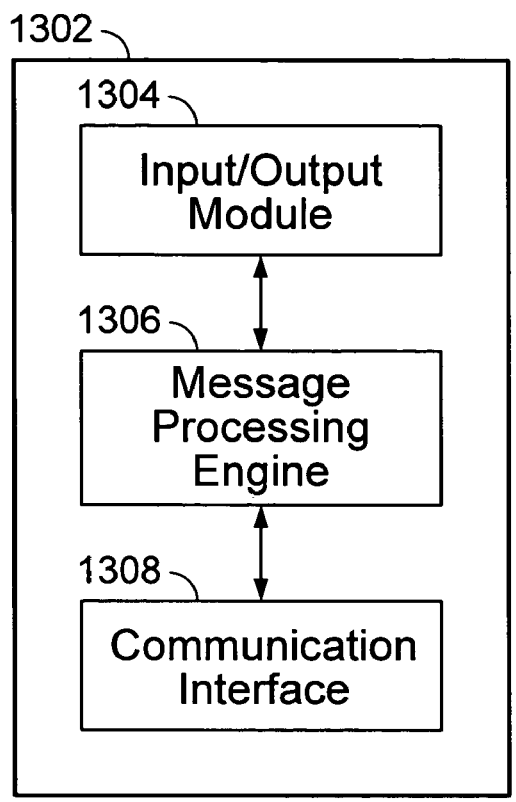
FIG. 13 is a block diagram illustrating sending equipment as implemented in one embodiment.

FIG. 13 is a block diagram illustrating sending equipment as implemented in one embodiment. Sending equipment 1302 comprises an input/output module 1304 configured to receive input from and/or display output to a user of the sending equipment 1302. In one embodiment, the sending equipment 1302 may be configured to receive via the input/output module 1304, e.g., through an associated user interface, message data associated with a message to be sent to an intended recipient associated with and/or indicated by the data. The sending equipment 1302 further includes a message processing engine 1306 configured to receive outbound message data from and provide inbound message data to input/output module 1304. In one embodiment, the message processing engine is configured to redirect and/or mirror outgoing messages to a compliance system (or other redirection or mirroring destination), e.g., using one of the approaches described herein, including without limitation in connection with one or more of FIGS. 1-3, 5-6, and 8-11. The sending equipment 1302 further includes a communication interface 1308 configured to transmit message from and receive messages sent to the sending equipment 1302. In one embodiment, the sending equipment 1302 is a sending mobile equipment and the communication interface 1308 includes a transceiver configured to transmit outgoing messages and receive incoming messages to/from a mobile network. The communication interface 1308 is configured to provide incoming messages to and receive outgoing messages from message processing engine 1306. In one alternative embodiment, communication interface 1308 is configured to provide message data associated with incoming messages directly to input/output module 1304. Depending on the implementation, the sending equipment 1302 may include other, further, and/or different structures and modules than those shown.

Figure 14:
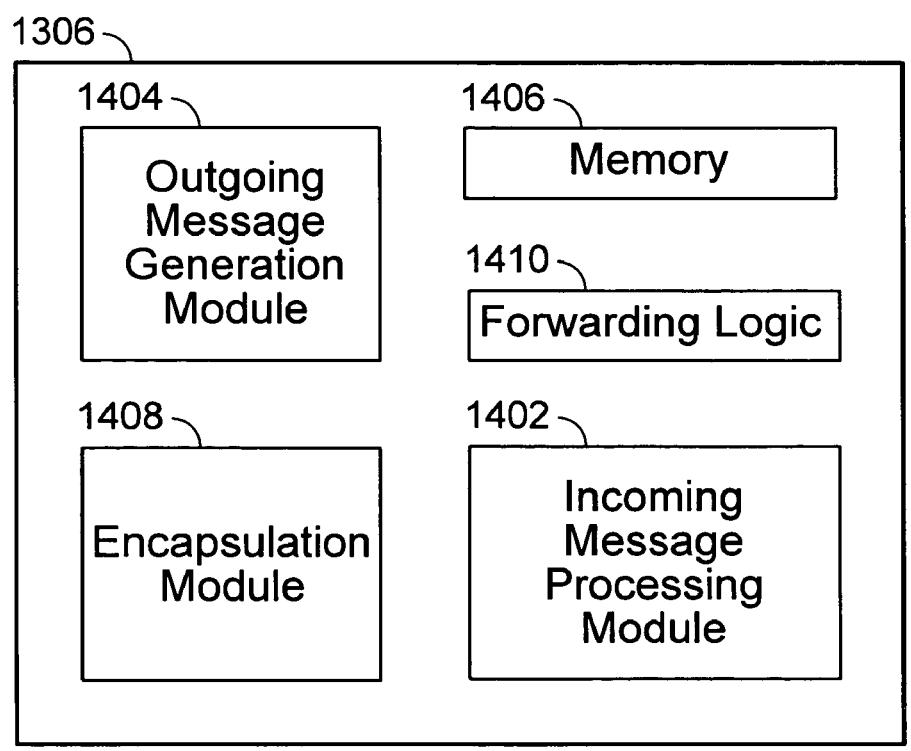
FIG. 14 is a block diagram illustrating a message processing engine as implemented in one embodiment.

FIG. 14 is a block diagram illustrating a message processing engine as implemented in one embodiment. In this example, the message processing engine 1306 includes an incoming message processing module 1402 configured to receive and process incoming messages and provide associated data to an input/output module, e.g., for display to a user via a display or other interface. In an embodiment in which the sending equipment in which the message processing engine 1306 is implemented as shown in FIG. 14 is configured to send an outgoing message to a compliance engine and wait for authorization before sending the message to its intended recipient, as shown in FIG. 5, the incoming message processing module 1402 is configured to receive and process reply messages received from a compliance system and provide to forwarding logic 1410 data indicating whether the message is authorized to be sent. The message processing engine 1306 also includes an outgoing message generation module 1404. In one embodiment, the outgoing message generation module 1404 is configured to generate an outgoing message based on message data as received from an input/output module such as input/output module 1304 of FIG. 13. In other embodiments, the message may be generated based in whole or in part on data received and/or otherwise available from other sources. The message processing engine 1306 further includes an encapsulation module 1408 configured to encapsulate messages generated by outgoing message generation module 1404 for sending to a compliance system, e.g., for prior approval and/or other processing. A memory 1406 is configured in one embodiment to store messages pending approval from a compliance system and/or other data associated with incoming, outgoing, sent, and/or received messages. If prior approval is required and received, a forwarding engine 1410 included in the message processing engine causes the approved message to be provide to a communication interface such as communication interface 1308 to be sent to its intended recipient. In one embodiment, the forwarding logic may be configured to send the encapsulated copies of message to the compliance system for processing. In one embodiment, one or more of the elements shown in FIG. 14 are implemented by implementing appropriate instructions in firmware, software, and/or hardware associated with the sending equipment in which the message processing engine is implemented. Any suitable approach to implementing the elements shown may be used.

While a "compliance system" is described in a number of the examples discussed in detail herein, the destination of the redirected and/or mirrored data message may in other embodiments comprise any system, process, person, or other destination to which it may be desired that such redirected and/or mirrored messages be sent.

Using the approaches described herein, data messages may be archived, monitored, analyzed, otherwise processed, and in some embodiments quarantined (i.e., blocked) without requiring modification to the infrastructure used to communicate either the redirected or mirrored copy of data messages to a compliance system and/or the infrastructure (if different) used to communicate the original underlying data message to its intended recipient. Effective monitoring and/or control of data messages sent by employees and/or other users may be achieved, even under circumstances in which data messages are sent in a way or under conditions such that it may not be possible, economically feasible, and/or convenient to implement monitoring/control by inspecting data messages while in transit. For example, in some circumstances there may not be any suitable in-transit inspection/control point under the control of the party that desires and/or is required to archive, monitor, and/or control data messages due to the nature of the sending equipment and/or messaging technology and/or infrastructure used (e.g., data messages sent using mobile devices and/or related networks and protocols, instant messaging, etc.). By configuring messaging clients to redirect and/or mirror data messages, effective monitoring and/or control is achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of sending data messages, comprising:
   addressing a data message or a copy thereof, in a manner transparent to an author of the data message, to an end destination other than an intended recipient to which the author addressed the data message, using a policy compliance destination address not associated with the intended recipient, for processing at said end destination in accordance with a computer implemented policy;
   using a sending equipment used by the author to generate the data message to send the data message or a copy thereof to said end destination other than the intended recipient;
   receiving at the sending equipment a second data message;
   sending a copy of the second data message to the destination other than the intended recipient; and
   displaying content data associated with the second data message to a user of the sending equipment only if a response is received from the destination other than the intended recipient indicating that the second data message is authorized;
   wherein the policy compliance destination address is of a same type of address used by the author to address the data message.

2. A method as recited in claim 1, wherein said processing in accordance with a policy comprises archiving the data message.

3. A method as recited in claim 1, wherein said processing in accordance with a policy comprises analyzing metadata associated with the data message and selectively archiving the data message, wherein the determination of whether the data message is archived is based at least in part on a result of the analysis of the metadata.

4. A method as recited in claim 1, wherein said processing in accordance with a policy comprises analyzing message content associated with the data message and selectively archiving the data message, wherein the determination of whether the data message is archived is based at least in part on a result of the analysis of said message content.

5. A method as recited in claim 1, wherein said processing in accordance with a policy comprises blocking the data message from being sent to the intended recipient if the policy requires that the data message be blocked.

6. A method as recited in claim 1, wherein said processing in accordance with a policy comprises blocking the data message from being sent to the intended recipient if the policy requires that the data message be blocked as determined based at least in part on an analysis of metadata associated with the data message.

7. A method as recited in claim 1, wherein said processing in accordance with a policy comprises blocking the data message from being sent to the intended recipient if the policy requires that the data message be blocked as determined based at least in part on an analysis of message content associated with the data message.

8. A method as recited in claim 1, wherein said processing in accordance with a policy comprises modifying the data message prior to its being sent to the intended recipient if the policy requires that the data message be modified prior to being sent to the intended recipient.

9. A method as recited in claim 1, further comprising:
   receiving message data associated with the data message; and
   generating the data message based at least in part on the received message data.

10. A method as recited in claim 1, further comprising:
    waiting to receive a response from the destination other than the intended recipient;
    receiving said response from the destination other than the intended recipient; and
    sending the data message to the intended recipient only if said response indicates that the message is authorized.

11. A method as recited in claim 1, further comprising sending the data message to the intended recipient.

12. A method as recited in claim 1, wherein sending the data message or a copy thereof to a destination other than the intended recipient comprises encapsulating the data message and sending it to the destination other than the intended recipient.

13. A method as recited in claim 1, wherein sending the data message or a copy thereof to a destination other than the intended recipient comprises sending the data message to the destination other than the intended recipient as an attachment to a forwarding message sent to the destination other than the intended recipient.

14. A method as recited in claim 1, wherein sending the data message or a copy thereof to a destination other than the intended recipient comprises creating a copy of the message, encapsulating the copy, and sending the encapsulated copy to the destination other than the intended recipient.

15. A method as recited in claim 1, wherein the data message comprises an e-mail message.

16. A method as recited in claim 1, wherein the data message comprises a simple message service (SMS) message.

17. A method as recited in claim 1, wherein the data message comprises an enhanced message service (EMS) message.

18. A method as recited in claim 1, wherein the data message comprises a multi-media message service (MMS) message.

19. A method as recited in claim 1, wherein the data message comprises a voice-mail message.

20. A method as recited in claim 1, wherein the data message comprises an instant message.

21. A method as recited in claim 1, wherein the data message comprises a chat message.

22. A method as recited in claim 1, wherein the data message comprises data in xml format.

23. A method as recited in claim 1, wherein the sending equipment used to generate the data message comprises equipment used to originate the data message as an outgoing message addressed at least initially to the intended recipient.

24. A method as recited in claim 1, wherein the sending equipment used to generate the data message comprises equipment that has been used or is intended to be used to send the data message to the intended recipient.

25. A method as recited in claim 1, further comprising providing including in the data message as a sending address an address associated with the destination other than the intended recipient.

26. A method as recited in claim 1, further comprising providing to the intended recipient as an address associated with the sending equipment an address associated with the destination other than the intended recipient.

27. A method as recited in claim 1, further comprising providing to the intended recipient as an address associated with a user associated with the sending equipment an address associated with the destination other than the intended recipient.

28. A method as recited in claim 1, wherein the sending equipment is configured to send messages only to the destination other than the intended recipient.

29. A method as recited in claim 1, wherein the sending equipment is configured to accept only those messages sent to it from the destination other than the intended recipient.

30. A system for sending a data message, comprising:
- a processor configured to address the data message or a copy thereof, in a manner transparent to an author of the data message, to an end destination other than an intended recipient to which the author addressed the data message, using a policy compliance destination address not associated with the intended recipient, for processing at said end destination in accordance with a computer implemented policy; and
- a communication interface configured to transmit the data message or a copy thereof to said end destination;
- wherein the system comprises a sending equipment used by the author to generate the data message to send the data message or a copy thereof to said end destination other than the intended recipient, and the policy compliance destination address is of a same type of address used by the author to address the data message, the sending equipment receives a second data message and sends a copy of the second data message to the destination other than the intended recipient, and content data associated with the second data message is displayed to a user of the sending equipment only if a response is received from the destination other than the intended recipient indicating that the second data message is authorized.

31. A computer program product for sending a data message, the computer program product being embodied in a computer readable medium and comprising computer instructions for:
- addressing a data message or a copy thereof, in a manner transparent to an author of the data message, to an end destination other than an intended recipient to which the author addressed the data message, using a policy compliance destination address not associated with the intended recipient, for processing at said end destination in accordance with a computer implemented policy;
- using a sending equipment used by the author to generate the data message to send the data message or a copy thereof to said end destination other than the intended recipient;
- receiving at the sending equipment a second data message;
- sending a copy of the second data message to the destination other than the intended recipient; and
- displaying content data associated with the second data message to a user of the sending equipment only if a response is received from the destination other than the intended recipient indicating that the second data message is authorized;
- wherein the policy compliance destination address is of a same type of address used by the author to address the data message.

* * * * *